(12) United States Patent
Wade et al.

(10) Patent No.: US 7,546,827 B1
(45) Date of Patent: Jun. 16, 2009

(54) METHODS FOR VARIABLE DISPLACEMENT ENGINE DIAGNOSTICS

(75) Inventors: Robert Andrew Wade, Dearborn, MI (US); Jeffrey Allen Doering, Canton, MI (US); John Eric Rollinger, Sterling Heights, MI (US); William Russell Goodwin, Farmington Hills, MI (US)

(73) Assignee: Ford Global Technologie, LLC, Dearborn, MI (US)

( * ) Notice: Subject to any disclaimer, the term of this patent is extended or adjusted under 35 U.S.C. 154(b) by 0 days.

(21) Appl. No.: 12/196,167

(22) Filed: Aug. 21, 2008

(51) Int. Cl.
*F01L 13/00* (2006.01)
(52) U.S. Cl. ............... 123/324; 123/198 F; 123/90.15; 123/691; 123/692
(58) Field of Classification Search ............. 123/90.11, 123/90.15–90.18, 198 F, 324, 691, 692
See application file for complete search history.

(56) References Cited

U.S. PATENT DOCUMENTS

| | | | |
|---|---|---|---|
| 4,467,758 A * | 8/1984 | Ueno et al. ............... | 123/198 F |
| 6,401,684 B2 * | 6/2002 | Hori et al. ................ | 123/198 F |
| 6,415,753 B1 | 7/2002 | Nagaosa et al. | |
| 7,207,301 B2 | 4/2007 | Hathaway et al. | |
| 7,448,459 B2 * | 11/2008 | Kitajima et al. ............ | 180/65.4 |
| 2002/0017257 A1 | 2/2002 | Axmacher et al. | |
| 2003/0217728 A1 | 11/2003 | Hasebe et al. | |
| 2003/0226543 A1 * | 12/2003 | Glugla et al. ............... | 123/404 |
| 2006/0207536 A1 | 9/2006 | Todo et al. | |
| 2007/0068499 A1 | 3/2007 | Schneider et al. | |
| 2008/0300773 A1 * | 12/2008 | Winstead .................... | 701/105 |

FOREIGN PATENT DOCUMENTS

JP 2006-226266 8/2006

* cited by examiner

*Primary Examiner*—Erick Solis
(74) *Attorney, Agent, or Firm*—Allan J. Lippa; Alleman Hall McCoy Russell & Tuttle LLP

(57) ABSTRACT

Methods and systems are provided for monitoring cylinder valve deactivation in an engine operating with a plurality of cylinder valves. One example method comprises, sensing a plurality of cylinder valve positions of a plurality of cylinder valves; and combining the plurality of sensed positions to form a combined cylinder valve signal. The method may further include identifying valve degradation and differentiating valve degradation among the plurality of cylinder valves based on the combined cylinder valve signal and an expected value of the signal, and further based on a crank angle at which the expected value differs from the combined signal.

20 Claims, 9 Drawing Sheets

METHODS FOR VARIABLE DISPLACEMENT ENGINE DIAGNOSTICS

FIELD

The present application relates to methods and systems for monitoring cylinder valve operation in an engine, such as a variable displacement engine (VDE).

BACKGROUND AND SUMMARY

Engines operating with a variable number of active or deactivated cylinders may be used to increase fuel economy, while optionally maintaining the overall exhaust mixture air-fuel ratio about stoichiometry. In some examples, half of an engine's cylinders may be disabled during selected conditions, where the selected conditions can be defined by parameters such as a speed/load window, as well as various other operating conditions including vehicle speed. A VDE control system may disable selected cylinders through the control of a plurality of cylinder valve deactivators that affect the operation of the cylinder's intake and exhaust valves. Methods for monitoring valve operation in cylinders may be used to diagnose proper switching between VDE and non-VDE modes to ensure a proper transition.

One example approach for monitoring valve operation in cylinders is shown by Takao et al. in JP 2006226266. In this example, the output of a valve position sensor is used in combination with the output of an air/fuel ratio (AFR) sensor to identify aberrant exhaust valve function. Specifically, if the position sensor detects a distance from a reference position greater than a predetermined threshold, over a plurality of engine cycles, in addition to the AFR sensor detecting a change in the air/fuel ratio, degradation in the operation of a cylinder exhaust valve is concluded.

However, the inventors herein have recognized several potential issues with such an approach. As one example, the method assumes a higher occurrence of an imperfect exhaust valve closing as compared to an imperfect intake valve closing, thereby making the system insensitive to degradation in intake valve operation. For example, in the event of intake valve degradation with no significant change in AFR, the method may not detect any valve degradation. In another example, in an engine operating with a variable valve lift mechanism, the method may not be able to distinguish between valve lift profiles such as a high lift and a low lift profile. Further still, the method may not properly detect transient and/or single cycle valve faults.

Thus, in one example, the above issues may be addressed by a method of monitoring cylinder valve deactivation in an engine operating with a plurality of cylinder valves, the method comprising, sensing a plurality of cylinder valve positions of a plurality of cylinder valves and combining the plurality of sensed positions to form a combined cylinder valve signal. In this way, it is possible to utilize a plurality of sensed valve positions to identify either or both of intake or exhaust degradation, without requiring individual monitoring of each sensor. Further, individual valve degradation, such as degradation in VDE valve transitions, can also be identified based on the combined signal, and further based on a crank angle at which the combined signal differs from an expected value.

In one particular example, the engine is a four-cylinder variable displacement engine with two valves per cylinder, the operation of each valve monitored by respective rocker arm position sensors coupled to respective valve rocker arms. Herein, the sensor signals for all the intake valves, and likewise all the exhaust valves, may be coupled together electrically to generate combined cylinder valve signals such that the behavior of the 8 valves may be indicated by only two electrical inputs to a control system. In another example where the four cylinders are divided between two banks, the sensor signals for bank-specific intake and exhaust valves may be combined together.

In either sensing configuration, the sensor signals may be coupled together electrically such that changes in valve lift to any of the coupled valves affects the generated output. When sensing the plurality of valve positions, a respective binary value may be formed for each of the sensed positions. The plurality of sensed positions may be combined to form a combined cylinder valve signal. Herein, the binary values may be combined to form a binary combined valve signal value. The combined signal may be sampled in each of a plurality of sampling windows, such as a crank angle sampling window. An expected value of the combined cylinder valve signal may be calculated by a control system based on a VDE mode of operation. If the combined cylinder valve indication signal is an unexpected signal, a control system may indicate valve degradation and further identify the degraded valve between the plurality of valves sensed based on the crank angle sampling window at which the expected value differs from the combined signal.

In this way, the number of valve position inputs received and processed by a control system may be reduced without affecting the control system's ability to discern individual valve faults. In a variable displacement engine operating with a plurality of cylinder valves, the method may be used to monitor proper switching between VDE and non-VDE modes of operation. As such, the method also enables detection of single cycle valve faults which, if left unchecked, can contribute to degradation of valve train components such as deactivating pins and pistons, valves and valve seats. Thus, by enabling the detection of single cycle faults, fatigue failure of valve train components can be averted. By allowing a faster detection of degraded valve operation, adverse impacts thereof on engine fuel efficiency and performance can be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 3A:
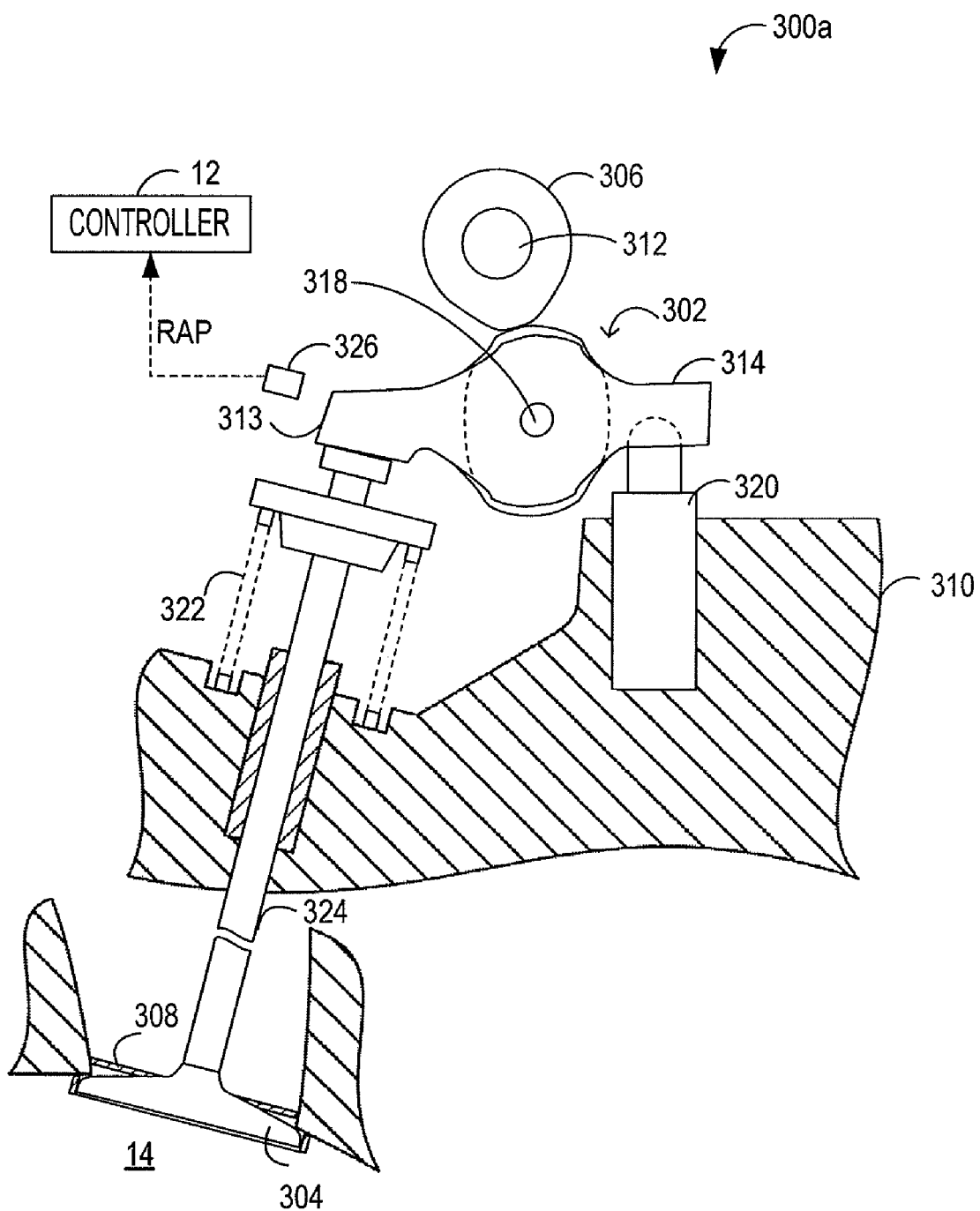
FIGS. 3A-B show alternate embodiments of a variable valve actuator including a rocker arm.
Figure 3B:
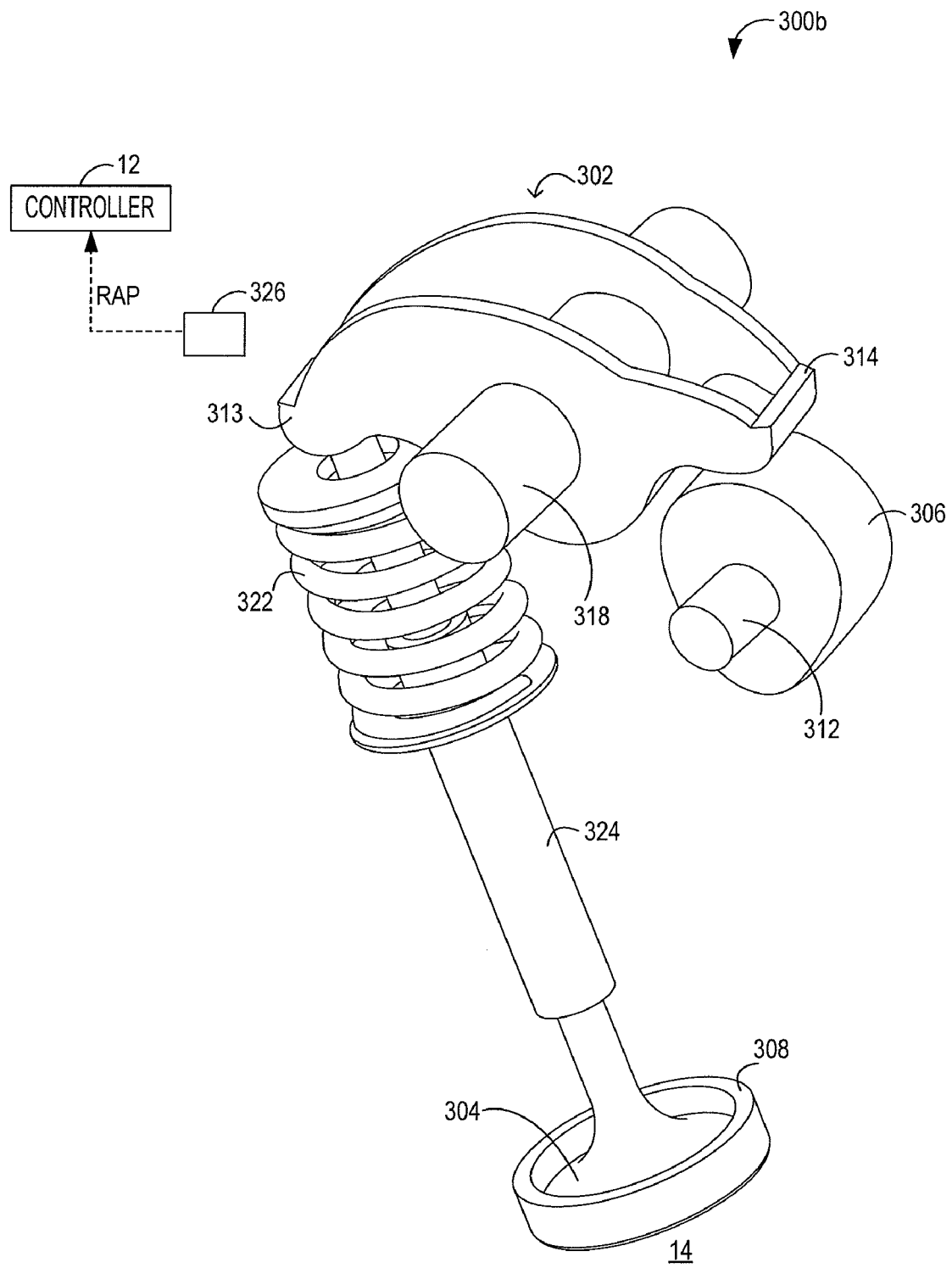
Figure 5:
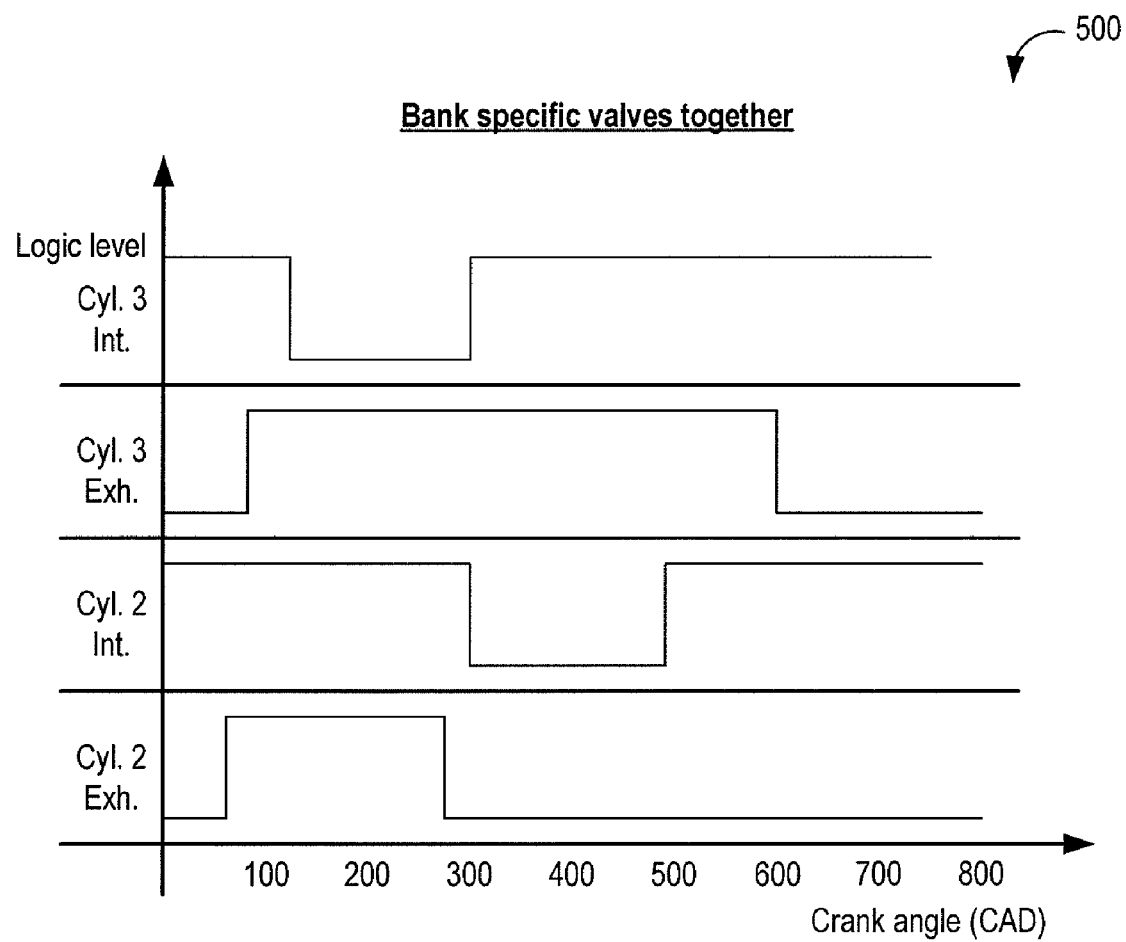
FIG. 5 show a map of variation in RAP signal for bank specific valves sensed together.
Figure 6:
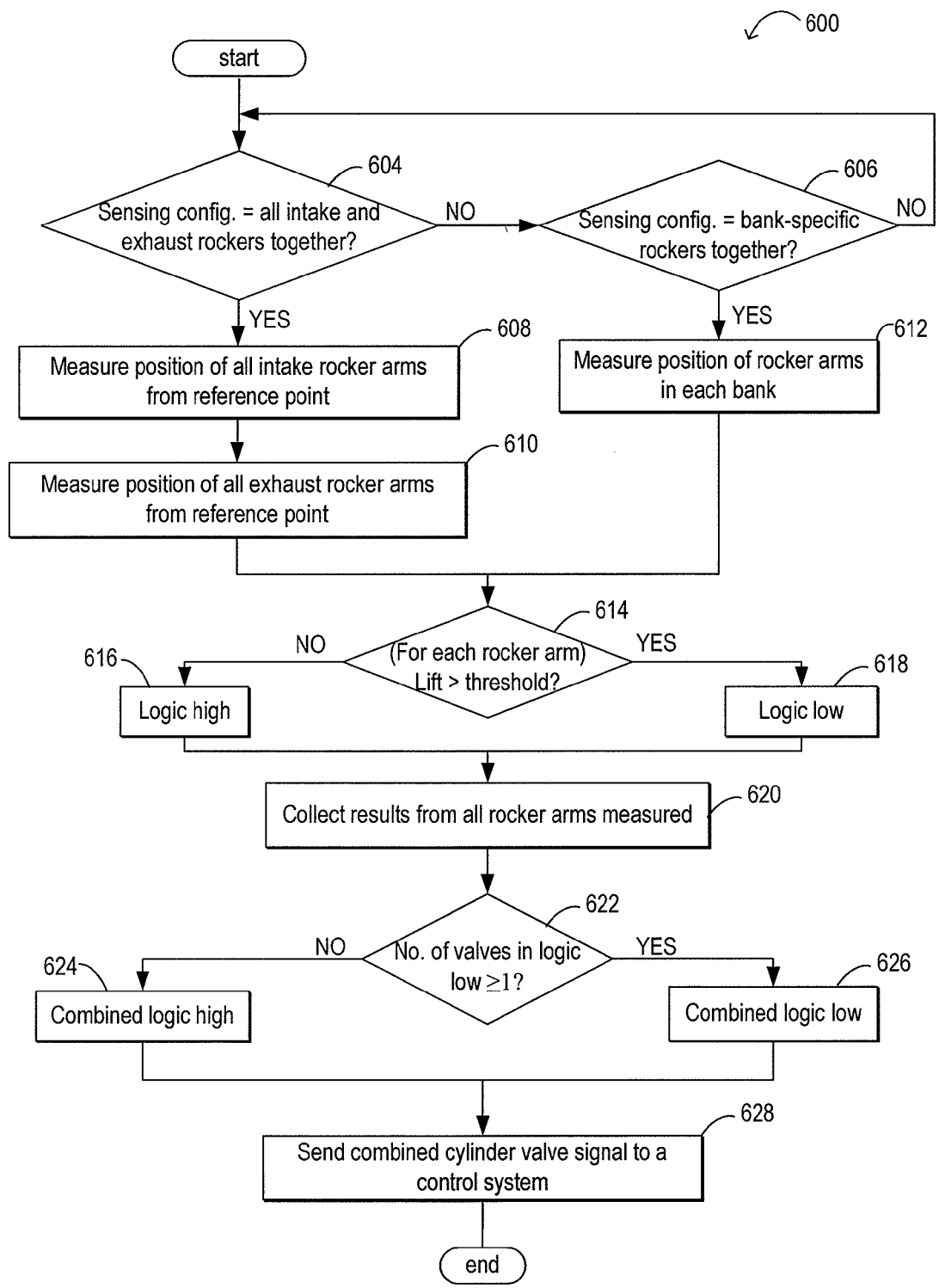
FIG. 6 shows a high level flow chart for generating a combined cylinder valve signal.

The following description relates to systems and methods for monitoring valve operation in cylinders of an engine operating with variable displacement. As such, the variable displacement engine (VDE) can switch between operation with all cylinders firing or half the cylinders firing by changing the operation of the intake and exhaust valves of selected cylinders. An engine control system uses valve position sensors, as illustrated in FIGS. 3A-B, to monitor whether a valve's rocker arm has returned to the desired base circle position or not. As illustrated in FIG. 4, the sensors from a plurality of intake valves may be electrically daisy-chained together to monitor intake valve operation while the sensors from a plurality of exhaust valves may be daisy-chained together to monitor exhaust valve operation. Alternatively, as illustrated in FIG. 5, the sensors from the intake and exhaust valves of a specific bank may be chained together to monitor bank-specific valve operation. The signals from the plurality of coupled valve positions sensors may be processed following a processing routine, as illustrated in FIG. 6, to generate a combined cylinder valve signal that is communicated with a control system. The combined cylinder valve signal may be sampled at unique points along the engine cycle, such as predetermined crank angles, and compared to an expected value of the combined signal. Subsequently, based on the sampling window at which an expected value differs from the combined signal, valve degradation can be differentiated among the plurality of valves sensed, as illustrated in the example diagnostics routine of FIG. 7. In this way, single cycle and transient valve faults may be detected in addition to persistent valve faults during VDE transitions.

Figure 1:
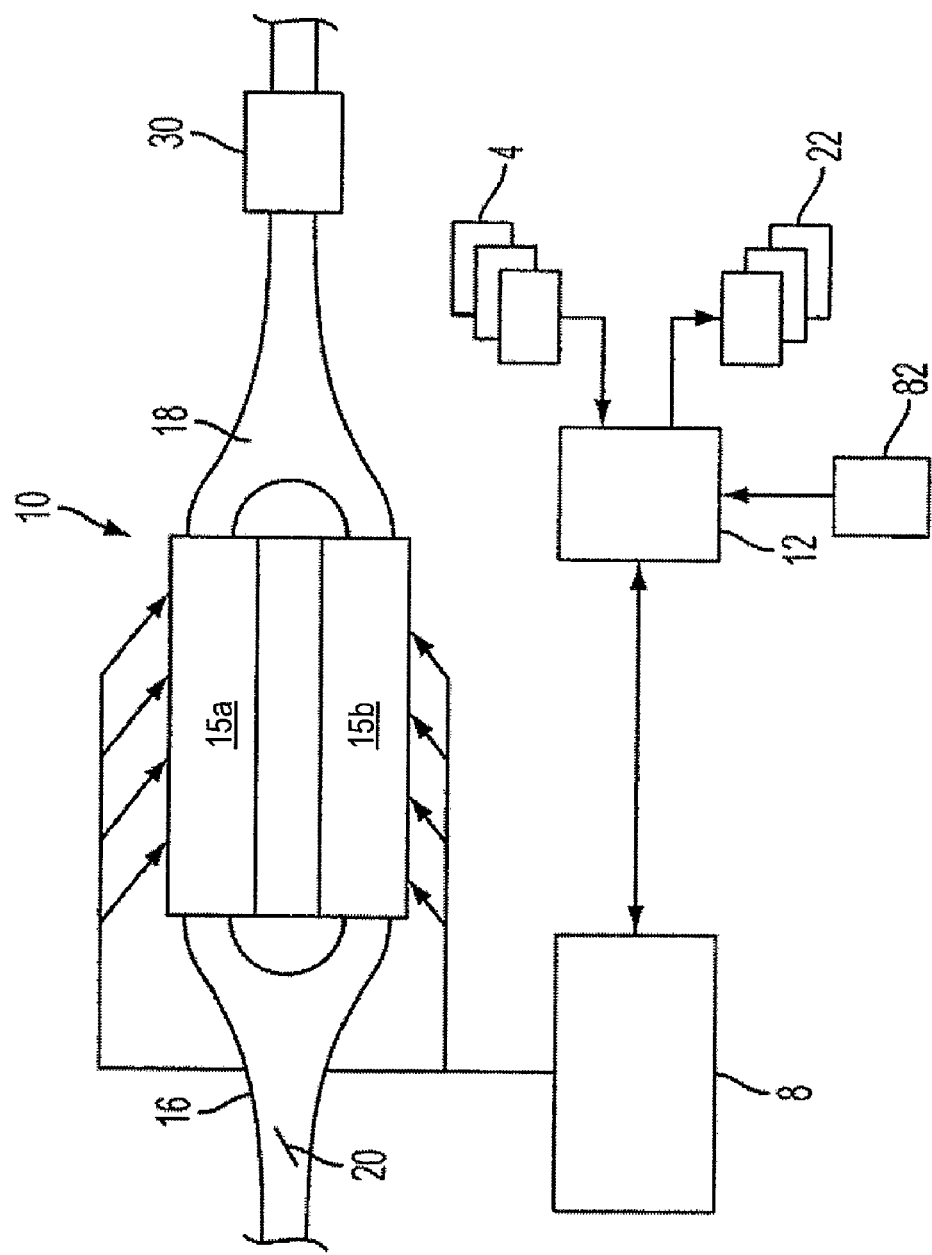
FIG. 1 shows an example engine and exhaust system layout.

FIG. 1 shows an example variable displacement engine (VDE) 10, in which four cylinders (e.g., two in each bank) may have cylinder valves held closed during one or more engine cycles. The cylinder valves may be deactivated via hydraulically actuated lifters, in some examples coupled to valve pushrods, as further illustrated in FIGS. 3A-B, or via a cam profile switching mechanism in which a cam lobe with no lift is used for deactivated valves. As depicted herein, engine 10 is a V8 engine with two cylinder banks 15a and 15b having an intake manifold 16 (with throttle 20) and an exhaust manifold 18 coupled to an emission control system 30 including one or more catalysts and air-fuel ratio sensors.

Engine 10 may operate on a plurality of substances, which may be delivered via fuel system 8. Engine 10 may be controlled at least partially by a control system including controller 12. Controller 12 may receive various signals from sensors 4 coupled to engine 10, and send control signals to various actuators 22 coupled to the engine and/or vehicle. Further, controller 12 may receive an indication of knock from knock sensor 82.

Figure 2:
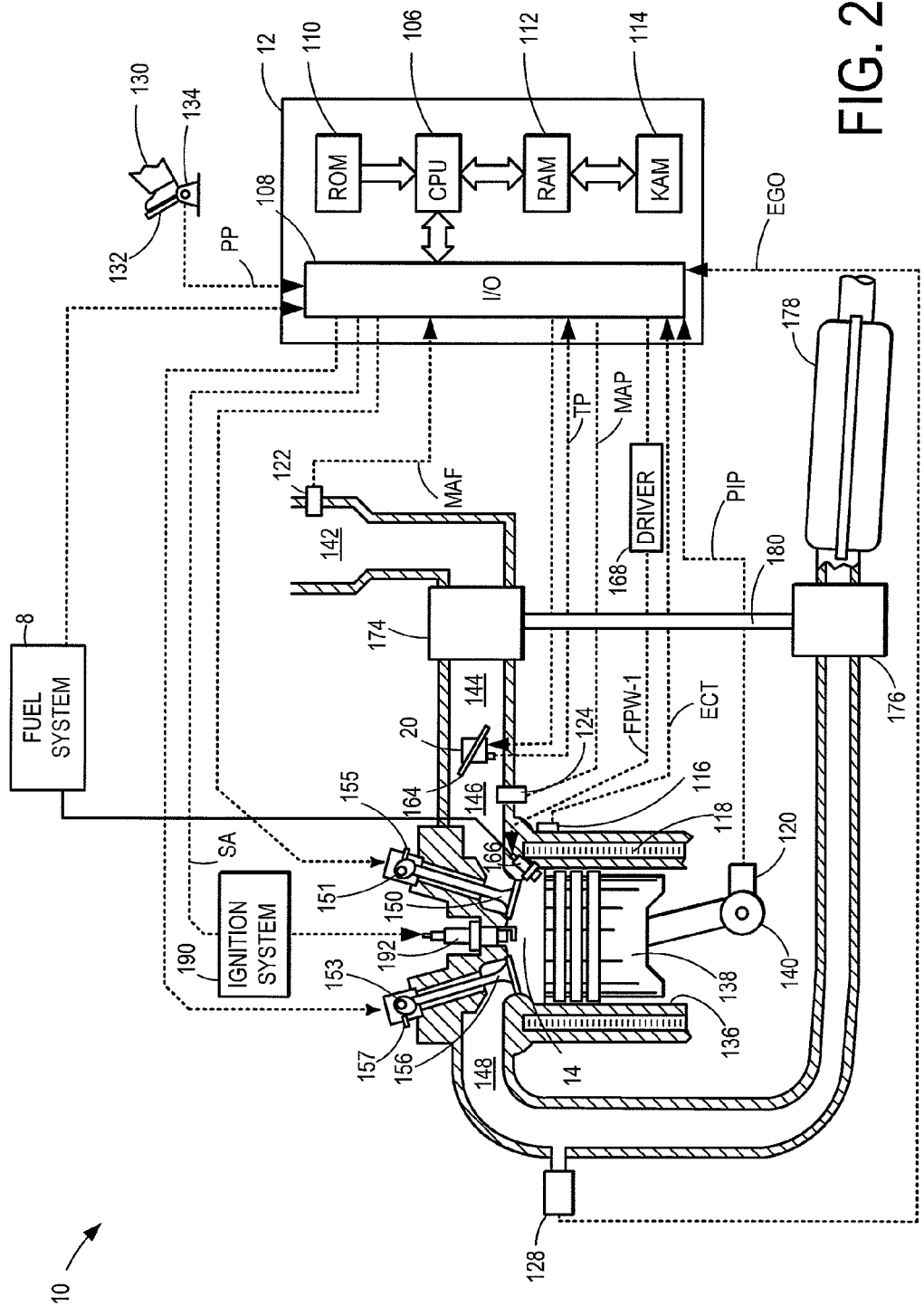
FIG. 2 shows a partial engine view.

FIG. 2 depicts an example embodiment of a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some embodiments, one or more of the intake passages may include a boosting device such as a turbocharger or a supercharger. For example, FIG. 2 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger. However, in other examples, such as where engine 10 is provided with a supercharger, exhaust turbine 176 may be optionally omitted, where compressor 174 may be powered by mechanical input from a motor or the engine. A throttle 20 including a throttle plate 164 may be provided along an intake passage of the engine for varying the flow rate and/or pressure of intake air provided to the engine cylinders. For example, throttle 20 may be disposed downstream of compressor 174 as shown in FIG. 2, or alternatively may be provided upstream of compressor 174.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Exhaust temperature may be estimated by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods listed herein.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder. The valves of deactivatable cylinder 14 may be deactivated via hydraulically actuated lifters coupled to valve pushrods, or via a cam profile switching mechanism in which a cam lobe with no lift is used for deactivated valves. In this example, deactivation of intake valve 150 and exhaust valve 156 may be controlled by cam actuation via respective cam actuation systems 151 and 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 150 and exhaust valve 156 may be determined by valve position sensors 155 and 157, respectively. In alternative embodiments, the intake and/or exhaust valve may be controlled by electric valve actuation. For example, cylinder 30 may alternatively include an intake valve controlled via electric valve actuation and an exhaust valve controlled via cam actuation including CPS and/or VCT systems.

As depicted herein, in one embodiment, deactivation of intake valve 150 may be controlled by cam-based VDE actuator 151 while deactivation of exhaust valve 156 may be controlled by cam-based VDE actuator 153. In alternate embodiments, a single VDE actuator may control deactivation of both intake and exhaust valves of the deactivatable cylinder. In still other embodiments, a single cylinder valve actuator deactivates a plurality of cylinders (both intake and exhaust valves), for example all the cylinders in the deactivated bank, or a distinct actuator may control deactivation for all the intake valves while another distinct actuator controls deactivation for all the exhaust valves of the deactivated cylinders on a bank. It will be appreciated that if the cylinder is a non-deactivatable cylinder of the VDE engine, then the cylinder may not have any valve deactivating actuators.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some embodiments, each cylinder of engine 10 may be configured with one or more fuel injectors for providing fuel thereto. As a non-limiting example, cylinder 14 is shown including one fuel injector 166. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter also referred to as "DI") of fuel into combustion cylinder 14. While FIG. 2 shows injector 166 as a side injector, it may also be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a high pressure fuel system 8 including fuel tanks, fuel pumps, and a fuel rail. Alternatively, fuel may be delivered by a single stage fuel pump at lower pressure, in which case the timing of the direct fuel injection may be more limited during the compression stroke than if a high pressure fuel system is used. Further, while not shown, the fuel tanks may have a pressure transducer providing a signal to controller 12. It will be appreciated that, in an alternate embodiment, injector 166 may be a port injector providing fuel into the intake port upstream of cylinder 14.

It will also be appreciated that while in one embodiment, the engine may be operated by injecting the variable fuel blend via a direct injector; in alternate embodiments, the engine may be operated by using two injectors and varying a relative amount of injection from each injector.

Controller 12 is shown in FIG. 2 as a microcomputer, including microprocessor unit 106, input/output ports 108, an electronic storage medium for executable programs and calibration values shown as read only memory chip 110 in this particular example, random access memory 112, keep alive memory 114, and a data bus. Storage medium read-only memory 110 can be programmed with computer readable data representing instructions executable by processor 102 for performing the methods described below as well as other variants that are anticipated but not specifically listed. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Further, crankshaft position, as well as crankshaft acceleration, and crankshaft oscillations may also be identified based on the signal PIP. Manifold pressure signal MAP from a manifold pressure sensor may be used to provide an indication of vacuum, or pressure, in the intake manifold.

As further elaborated in FIGS. 3A-B, controller 12 may also receive a combined rocker arm position (RAP) signal from a plurality of rocker arm position sensor (RAPS), such as for example all the intake and exhaust valves of a specified engine bank. As depicted, the RAP sensor may be a Hall effect sensor configured to determine a distance of the rocker arm from a base circle, or reference position. As further illustrated in FIGS. 4-5, the input from a plurality of rocker arm position sensors may be electrically chained together to provide a reduced number of inputs to controller 12, to thereby determine a resultant "logic high" or "logic low" output condition. Controller 12 may be configured to compare the combined cylinder valve signal to an expected signal during a VDE diagnostics routine, for example routine 700 of FIG. 7.

FIGS. 3A-B depict example embodiments 300a and 300b of a variable valve actuator including a cylinder valve position sensor, coupled to a cylinder valve component, to generate a cylinder valve position signal. It will be appreciated that similar components have been similarly labeled in the two depicted embodiments. Now, with reference to embodiments 300a (FIG. 3A) and 300b (FIG. 3B), the valve component is a valve rocker arm 302 and the valve position sensor is a Hall-effect based rocker arm position sensor 326. As depicted, rocker arm 302 is coupled to intake valve 304. The variable valve actuator may be used to change the lift profile of the valve as well as to deactivate the valve during a VDE mode of engine operation. Rocker arm 302 may be configured to rotate about a rocker arm shaft 318. Specifically, the rocker arm 302 conveys radial information from the lobe of cam 306 into linear information at poppet intake valve 304 to change a valve lift amount. By changing the lift of the intake valve 304, the actuator may selectively open and close the intake port 308 of combustion chamber 14 defined in cylinder head 310 of engine 10. Camshaft 312 is formed with intake valve drive cam 306 for actuating the intake valve. The outer end 313 of the rocker arm is raised and lowered by the rotating lobes of cam 306 to allow the rocker arm to engage and activate valve stem 324. The motion at the outer end 313 of the rocker arm is transmitted to the valve stem 324. The inner end 314 of the rocker arm is engaged to a valve lash adjuster 320 which acts as a support upon which the rocker arm 302 pivots. As the cam lobe rotates on the camshaft, it causes the inner end 314 of the rocker arm 302 to be raised while at the same time the outer end 313 presses down on the valve stem 324, thereby opening the intake valve 304. When the rotating cam lobe causes the inner end of the rocker arm to be lowered, the outer end rises causing the return spring 322 to close the valve. While the depicted examples only show an intake valve drive cam, it will be appreciated that similar configurations may be present for an exhaust valve drive cam. Further the exhaust valve drive cam may be located axially next to the intake valve drive cam along the camshaft.

It will be appreciated that the effective leverage of the rocker arm, and thus the effective force it can exert on the valve stem is determined by the rocker arm ratio, that is, the distance from the rocker arm's center of rotation to the tip divided by the distance from the rocker arm's center of rotation to the point acted on by a cam roller (not shown). As such, the rocker arms may be steel or aluminum castings providing a balance between strength, weight and net manufacturing costs. However, in alternate embodiments, alternate materials may be used in the design of the rocker arms.

A valve position sensor, herein depicted as rocker arm position (RAP) sensor 326, detects the presence or absence of the rocker arm with respect to a reference position. As depicted, RAP sensor 326 is a Hall-effect sensor. However, alternate position sensors may be used. In the case of absence of the rocker arm from the reference point, the sensor may further determine a distance of the rocker arm from the reference point on the cam cover. As such, the "present" condition of the rocker arm indicates that the rocker arm has successfully returned to the reference position while the "absent" condition indicates that the valve has been opened by the camshaft.

Using a plurality of such valve position sensors, electrically coupled together in a daisy chain configuration, a system for monitoring cylinder valve deactivation in an engine operating with a plurality of cylinder valves may be configured. A plurality of the cylinder valve position sensors (herein RAP sensors) may be coupled together to generate a combined cylinder valve signal that is subsequently communicated to a control system, such as controller 12. The combined signal may be sampled in a plurality of crank angle sampling windows. The control system may be configured to calculate an expected value of the combined signal and upon receiving the combined cylinder valve indication signal, differentiate valve degradation among the valves based on the combined cylinder valve signal and an expected value of the combined signal, and further based on the crank angle at which the expected value differs from the combined signal. A map of valve opening events (as shown in FIGS. 4-5) relative to the combined cylinder valve signal received may provide an indication of the proper operation of the valve train system.

It will be appreciated that by changing the reference point in use by the valve position sensor, the sensor may also be used to determine whether a variable valve lift system has successfully switched between various valve lift profiles, such as a high lift profile and a low lift profile.

FIGS. 4-5 depict maps of rocker arm position (RAP) signals received from a plurality of coupled valve position sensors in various sensing modes or sensing configurations. As such, the sensor hardware and software may be interfaced in multiple configurations. In one example, as depicted in maps 400a-b (FIG. 4), it may be decided to electrically daisy chain the inputs from all intake valve position sensors together and similarly from all exhaust valve position sensors together. In another example, as depicted in map 500 (FIG. 5), it may be decided to electrically daisy chain the inputs from bank-specific intake and exhaust valve position sensors together. As such, the analog input from each sensor, indicative of a distance of the rocker arm from a fixed reference point off the cam cover, may first be converted to a binary digital input. For example, based on the difference between the estimated distance and a predetermined threshold value, the sensor may produce "logic high" or "logic low" signals. Subsequently, the signals may be combined to generate a reduced number of outputs, for example a single binary combined valve signal value, for the plurality of intake valves sensed and a single binary combined valve signal value for the plurality of exhaust valves sensed. The reduced number of outputs are then communicated to a control system, which upon comparison of the generated signal to an expected signal, identifies valve degradation. In this way, the plurality of sensed valve positions may form respective binary values which may then be combined to form a binary combined valve signal value for easier signal processing.

Figure 4A:
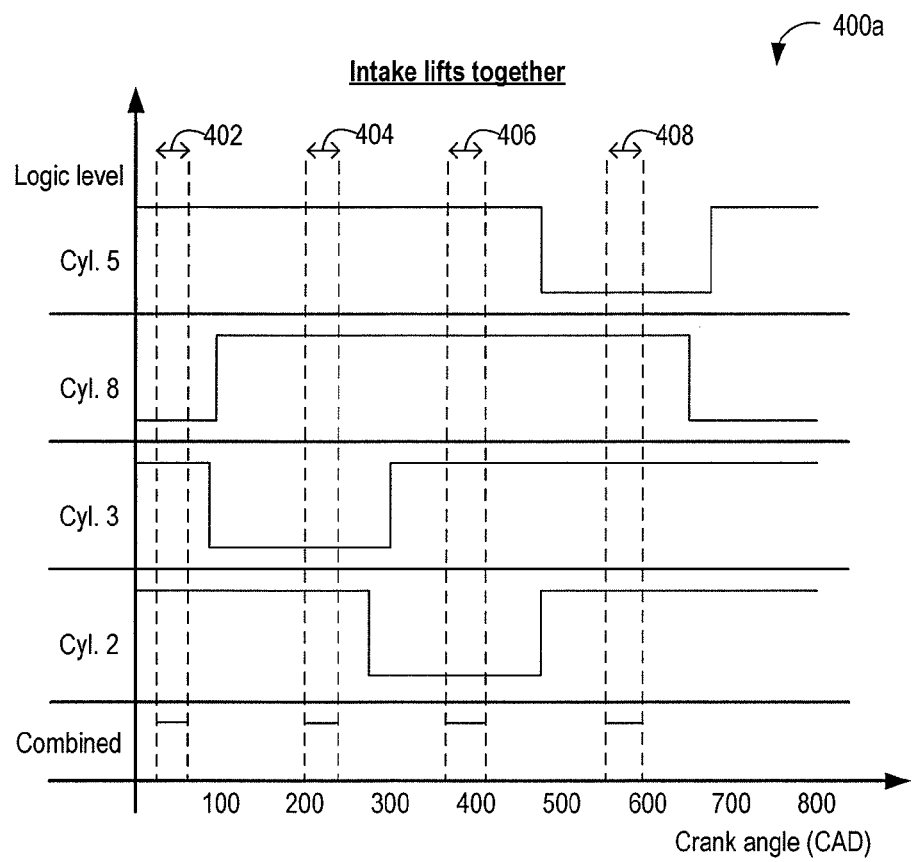
FIGS. 4A-B shows maps of variation in RAP signals for intake valves and exhaust valves sensed together, including during VCT changes.
Figure 4A:
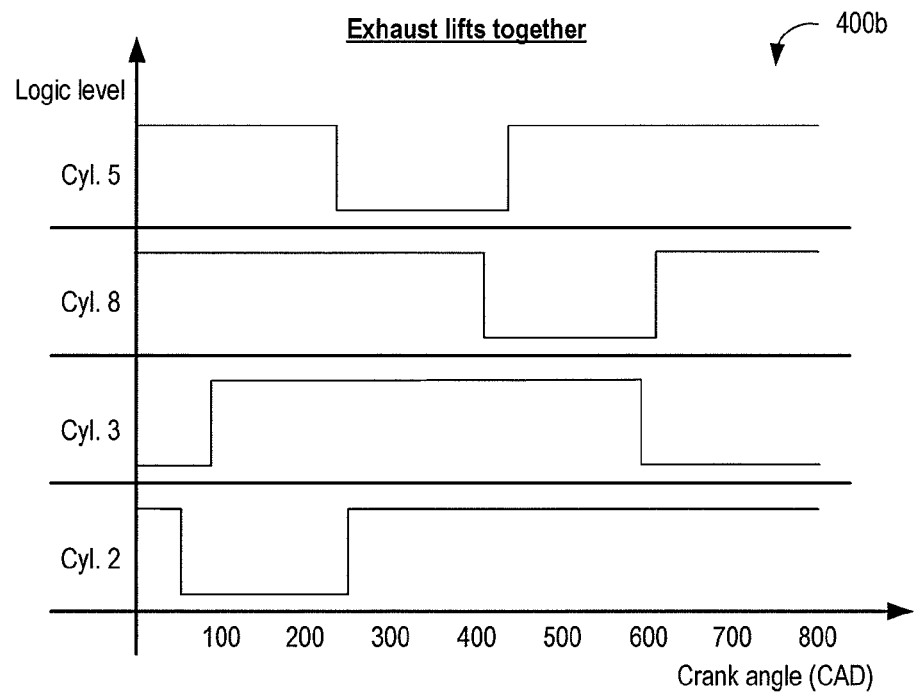
Figure 4B:
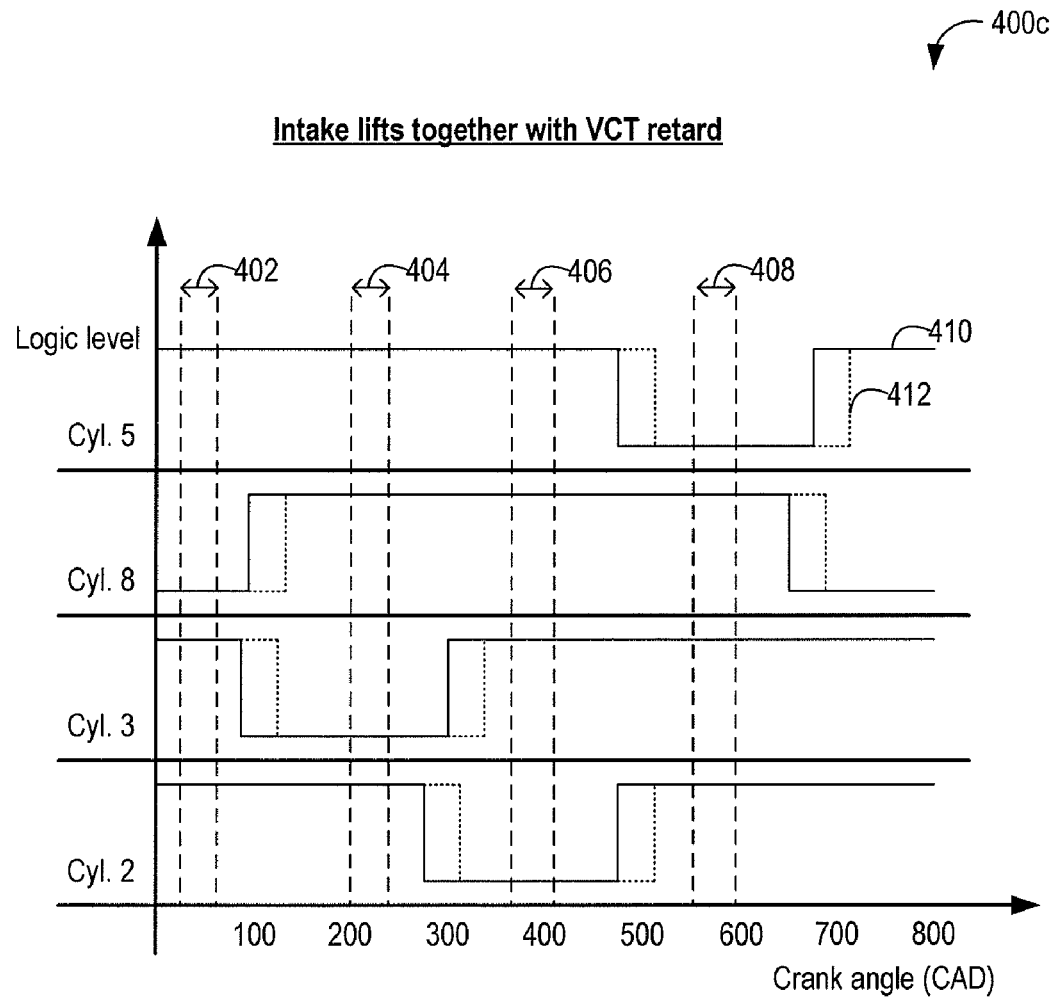

In FIG. 4A, map 400a depicts individual RAP signal levels for a plurality of intake valves while map 400b depicts individual RAP signal levels for a plurality of exhaust valves. Map 400a further depicts a combined cylinder valve signal generate from the plurality of intake valve RAP signals. As such, maps 400a-b may be used when the sensing mode selected is for a plurality of intake valves or a plurality of exhaust valves located on a common bank or on different banks, to be sensed together. Alternatively, the plurality of valves may be located on a common cylinder. In each map, the logic level (along the y-axis) is sampled at varying points along the engine cycle, depicted herein as crank angles (along the x-axis), is illustrated for the intake valves (map 400a) or exhaust valves (map 400b) of cylinders 2, 3, 5, and 8, all located on a common bank. As such, each corresponding valve position, and hence each corresponding valve position signal, may vary based on the cylinder firing order. A Hall-effect based RAP sensor coupled to the intake/exhaust valve rocker arm of each valve estimates a distance between the position of each of the plurality of cylinder valves and their respective reference positions. In one example, the reference position is a base circle position on the cam cover and based on the distance, each of the plurality of sensed positions may form respective binary values, such a logic high or a logic low signal. During the sampling window, if the estimated distance is greater than a predetermined threshold, logic low is indicated. Conversely, if the estimated distance is lower than the predetermined threshold, logic high is indicated. In one example, when the estimated distance, or lift value, exceeds 5 mm, "logic low" is indicated. Similarly, if the lift value falls below 1 mm, "logic high" is indicated.

A common open collector may electrically combine binary values to form a binary combined valve signal value and communicate this combined signal with a control system. Combining the binary values may include, if any of the indicated binary values is a logic low signal, a first binary combined valve signal value of logic low may be indicated. Alternatively, if none of the indicated logic binary values is a logic low signal, a second binary combined valve signal of logic high may be indicated. In one example, the common open collector may be an integrated circuit with an AND gate. It will be appreciated that the control system may be configured to only receive the combined cylinder valve signal as an input, instead of individual valve position signals. In doing so, the number of inputs received and processed by the control system is reduced and signal processing is significantly facilitated. Additionally, the reduced number of input pins required translates into a substantial reduction in manufacturing costs.

For diagnostic purposes, as depicted herein, the combined cylinder valve signal for the plurality of intake/exhaust valves may be sampled at various positions along the engine cycle. In one example, the sampling window is an engine crank angle sampling window. Alternatively, the logic edge transition angles may be sampled for degraded valve operation. However, it will be appreciated that the angle based data may potentially use more control system memory that the simpler logic level based data. When sampled in a particular crank angle sampling window, the angle range may be selected such that only one valve may be in a logic low state (that is in valve lift condition) at the selected angle. In one example, as illustrated in map 400a, intake valve operation may be sampled four times, in sampling windows or crank angle ranges (represented within dotted lines) 402, 404, 406 and 408. In another example, the valve positions may be sensed regularly at half-pip (or 45CAD) intervals. However, it will be appreciated that in alternate examples, a larger or a fewer number of crank angle ranges may be sampled based on, for example, the number of cylinders in the engine. In a similar fashion, appropriate sampling windows (not shown) may be determined for diagnosing exhaust valve operation. As such, the widest window of non-overlapping signals may be obtained when the plurality of intake valves or exhaust valves are coupled together.

Crank angle ranges 402-408 may be selected such that no signal overlap may occur in those ranges and as such represent ranges wherein only one intake valve may be in a valve lift condition. For example, as illustrated in map 400a, during crank angle range 402, the intake valve of cylinder 8 is the only one is a logic low or valve lift condition. Analogously, during ranges 404, 406 and 408, only the intake valves of cylinders 3, 2 and 5, respectively, are in logic low. During normal valve operation, the combined cylinder valve signal generated by the common open collector during these crank angle ranges may therefore always be at logic low, as depicted. During a diagnostics operation, the control system may first compute an expected value of the combined signal, for example based on a VDE mode of operation and a valve sensing configuration. The control system may be configured to then indicate and differentiate valve degradation among the plurality of cylinder valves sensed during the given sampling window by comparing the combined cylinder valve signal to the expected value of the combined signal, and if the combined cylinder valve signal is different, identify the degraded valve further based on the crank angle sampling window at which the expected value differs from the combined signal.

In one example, the engine VDE mode is determined to be a full cylinder activation mode and the sensing configuration is with the intake valves coupled together. Herein, when diagnosed, the combined cylinder valve signal sampled in crank angle range 406 is found to not match the expected logic low. As such, the combined signal in all other diagnosed ranges may have been as expected. Accordingly, a control system may conclude that the intake valve of cylinder 2 did not lift, and accordingly may indicate the valve degradation by setting a diagnostic code. In another example, if a cylinder is expected to be in a deactivated VDE mode and the combined signal indicates a logic low instead of a logic high when diagnosed in the appropriate sampling window, a control system may infer that the rocker arm of the corresponding cylinder valve has failed to return to the base position, and as such a valve degradation diagnostic code may be set. In this way, a plurality of cylinder valve positions of a plurality of cylinder valves may be sensed and combined to form a combined cylinder valve signal. By further analyzing the combined signal in a sampling window where no individual cylinder signal overlap may be expected, valve degradation among the plurality of valves may be differentiated and detected at the earliest.

It will be appreciated that the sampling window may be chosen such that the same sampling window may additionally be used during a change in cam timing, for example when operating the valves with variable cam timing (VCT). As depicted in map 400c (FIG. 4B), the individual intake valve position signals are shown at 0 CAD VCT (solid lines) and at 50 CAD VCT (dotted lines). Herein, the same sampled crank angle ranges may be used independent of cam timing changes. However, in alternate embodiments, the sampling window may be varied with cam timing. In one example, it may be desirable to change the sampling window with cam timing as a number of cylinders in the engine increases to widen a window of non-overlapping signals. The overlapping signals may cause valve timing and cam timing data to be confounded with each other. It will therefore be appreciated that sampling windows may be adjusted to identify cam timing and related errors. In one example, a continuous sampling window with discrete data may be used to determine cam phasing. In this way, by adjusting a valve timing of at least one of the plurality of valves and by further adjusting the sampling window responsive to the adjusted valve timing, valve degradation may be identified during cam phasing and VDE operations.

Map 400b, analogous to map 400a, depicts signal levels for a plurality of exhaust valve rocker arms sensed together. As such, the same signal processing method may be applicable here as previously described for map 400a. The logic level at varying crank angles is depicted for the same cylinders based on their firing order. It will be appreciated that for diagnostic purposes, the sampling window may be determined independently for the intake valves and the exhaust valves.

FIG. 5 depicts map 500, analogous to maps 400a-b, illustrating signal levels for a plurality of intake valves and a plurality of exhaust valves, located on a common bank, sensed together. Herein, the valve positions signals for the intake and exhaust valves of cylinders 2 and 3 are shown, before being combined to form a combined cylinder valve signal. As such, the same signal processing method may be applicable here as previously described for maps 400a-b. The logic level at varying crank angles is depicted for the cylinders based on their firing order. It will be appreciated that for diagnostic purposes, the sampling window may be varied based on the sensing configuration. As such, a wider window of non-overlapping signals may be available with the sensing configuration includes a plurality of intake valves or a plurality of exhaust valves sensed together.

While the depicted maps are indicative of the presence of absence of a valve lift, it will be appreciated that in alternate embodiments, by changing the reference point in use by the position sensor, the RAP signal may be used to determine whether a variable valve lift system has successfully switched between a high lift profile and a low lift profile. Herein, the RAP sensor position and electrical signal output generation may be adjusted such that the sensor may respond to a high lift profile of the valve with a logic low signal and respond to a low lift profile of the valve with a logic high signal. As such, by diagnosing the valve lift profiles, a cam profile switching (CPS) mechanism may also be monitored.

In this way, by combining a plurality of valve position sensors electrically, a reduced number of inputs may be provided to a control system, thereby reducing processing time and cost. Further, the combined signal may be processed to determine which valves are lifting or not lifting, based on unique points in the engine cycle, as described herein in crank angle degrees, where each valve lifts. By sampling the combined signal at or near the peak lift of each valve combination, the operating behavior of each valve may be individually assessed based on the combined signal at each sampling window. By further varying the sampling windows with changes in cam timing, the range of valve operations that can be monitored may be extended. In this way, the electrical input signal can be used to diagnose, in addition to persistent faults of improper valve operation, transient or single cycle faults where valve behavior does not change at the specified point in the specific engine cycle.

FIG. 6 depicts an example routine 600 that allows the individual RAP signals measured from a plurality of RAP sensors to be combined electrically to generate a single combined cylinder valve signal. The combined signal may then be communicated with a control system to enable the control system to identify aberrant valve operation during a VDE transition.

At 604, it may be determined whether the sensing configuration includes all intake and all exhaust rocker arms sensed together. If not, then at 606, it may be determined whether the sensing configuration includes all bank-specific intake and exhaust rocker arms sensed together.

If at 604 it is determined that the intake rocker arms and exhaust rocker arms are to be sensed together, then at 608, the position of all the intake rocker arms may be measured from the corresponding reference point. Next, at 610, the position of all the exhaust rocker arms may be measured from the corresponding reference point. In contrast, if at 606 it was determined that the bank-specific rockers are to be sensed together, then at 612, the position of all the intake and exhaust rocker arms in each bank may be measured from their corresponding reference points. Both 610 and 612 then lead to 614 where it is determined if the lift on each valve is greater than a predetermined threshold. That is, it is determined whether the distance of the rocker arm (for each valve) from the reference position is greater than the threshold. In one example, the threshold is 5 mm and if the lift is greater than 5 mm, then a logic low may be deduced at 618. In contrast, if the lift for any rocker arm is less than the threshold, then a logic high may be deduced at 616.

At 620, the signals measured from the different rocker arms may be combined by a common open collector, such as an AND gate on an integrated circuit, to generate a combined cylinder valve signal. At 622, the number of valves in a lifted condition, as indicated by the number of valves in logic low may be estimated. If one or more than one valve is in a logic low, then at 626, the collector may infer a combined or net logic low. In contrast, if none of the valves are in a logic low, then at 624, the collector may infer a combined or net logic high. At 628, the combined cylinder valve signal may be communicated with a control system. It will be appreciated that for each sensing mode chosen, at least two combined RAP signals may be generated for subsequent communication with a control system. For example, when the sensing mode selected is all the intake valves and all the exhaust valves sensed together, the combined signals sent to the control system may include a combined cylinder valve signal for the plurality of intake valves and a similar one for the plurality of exhaust valves. In contrast, when the sensing mode selected is bank-specific valves sensed together, the combined signals sent to the control system may include a combined cylinder valve signal for the plurality of valves on bank 1 and a similar one for the plurality of valves on bank 2. The control system may use these inputs to then perform a diagnostics routine to valve degradation, as described below.

Figure 7:
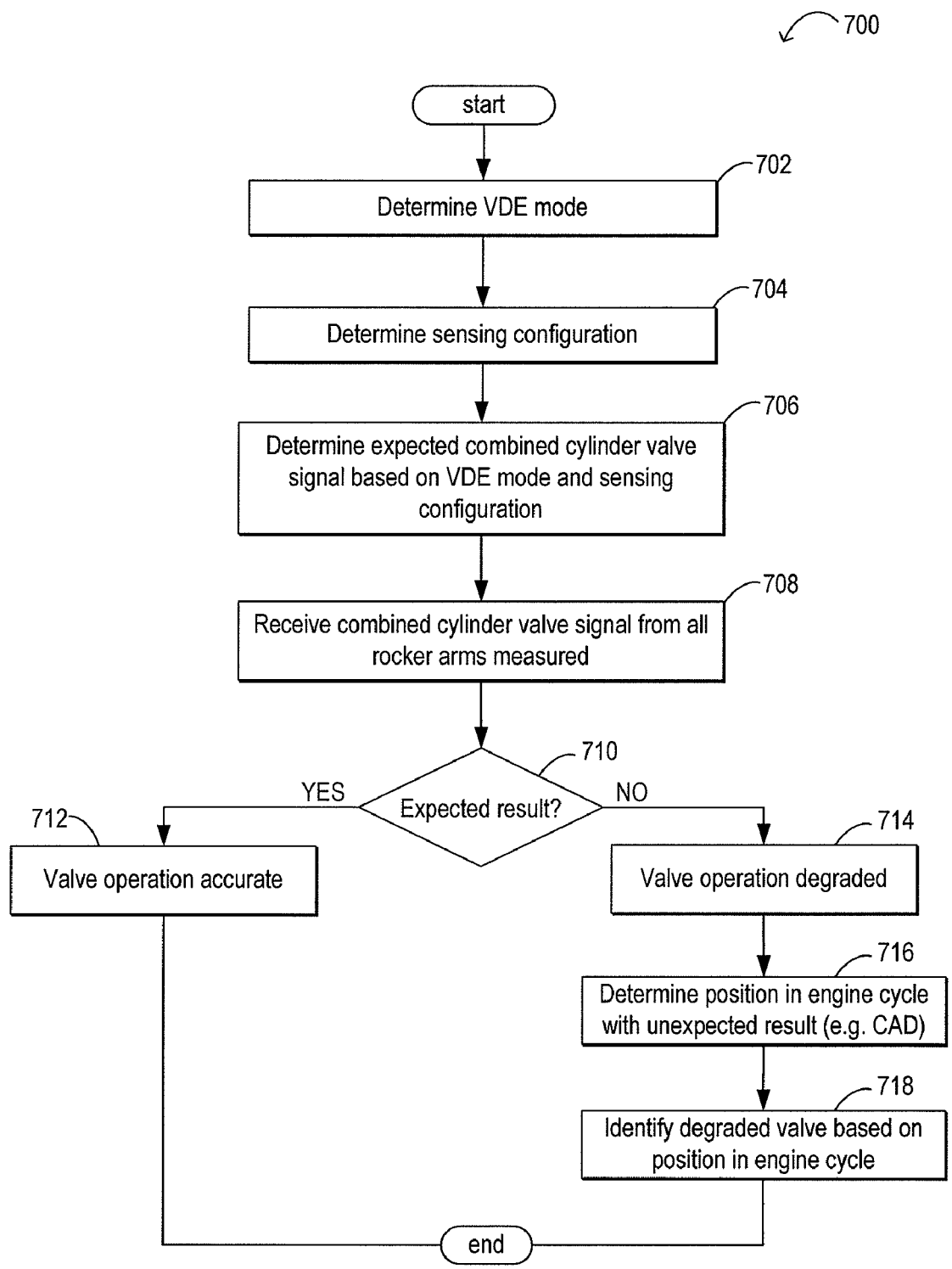
FIG. 7 shows a high level flow chart for a combined cylinder valve signal-based VDE diagnostics routine.

FIG. 7 depicts an example diagnostics routine 700 that may be performed by a control system to diagnose degradation in valve operation responsive to unexpected changes in a combined cylinder valve signal received from a plurality of valve position sensors. The routine may be capable of diagnosing valve degradation during persistent improper valve operation as well as during transient or single cycle faults.

At 702, the VDE mode of the engine is determined. In one example, it is first determined whether the engine is to be in a full cylinder activation mode or a cylinder deactivation mode. As such, during a full cylinder activation mode, all the cylinders may be expected to operate. In contrast, during a cylinder deactivation mode, some of the cylinders, for example the cylinders on one bank, may be deactivated. Next the sensing configuration is determined at 704 (as previously elaborated in routine 600). At 706, an expected combined cylinder valve signal is determined based on the VDE mode and the sensing configuration. At 708, the combined cylinder valve signal measured from the plurality of rocker arms may be received. As previously elaborated, the combined cylinder valve signal may be generated from individual signals by performing routine 600. The reduced number of combined RAP signals received by the control system enables easier and faster processing of data.

At 710, it is determined whether the result obtained at 708 is as expected or not. In one example, the control system may be configured to sample the combined cylinder valve signal at a plurality of sampling windows defined by crank angle ranges, as previously elaborated in FIG. 4. A look-up table may be used to determine an expected signal in each of those sampled windows and to then compare the expected result with that obtained at 708. In one example, it may have been determined at 702 that the engine is not in VDE mode and currently all cylinders are in full activation mode. Further, at 704, it may have been determined that the sensing configuration includes all the intake valves (and all the exhaust valves) together. Thus, at 706, the expected combined signal for the plurality of intake valves may be a logic low, indicative of all the intake valves of the cylinders in lift. If the combined cylinder valve signal received is as expected, then at 712, an accurate valve operation may be concluded. If, however, at 708 the combined RAP signal is a logic high, it indicates that at least one valve is not in a lifted condition, and at 710, an unexpected result may be concluded. Accordingly, at 714, a degraded valve operation may be determined and accordingly a diagnostic code may be set.

Next, at 716, the position in the engine cycle, that is the sampling window, where the unexpected combined cylinder valve signal was diagnosed may be determined. In one example, the look up table may be analyzed to determine which of the crank angle ranges sampled generated the unexpected signal. Accordingly, at 718, based on the sampling window, the identity of the degraded valve may be differentiated from the plurality of valves that were sensed. The lookup table may be configured to determine the valve identity based on the crank angle region sampled and the expected combined RAP signal. Alternatively, maps 400a-c may be used to identify the degraded valve. It will be appreciated that the sampling window may have been selected such that an unexpected result in any range may be mapped to a valve defect in only one valve, thereby facilitating diagnosis of valve degradation.

In this way, a plurality of valve position sensors may be electrically coupled to facilitate the monitoring of valve lift profiles for a plurality of valves and for diagnosing aberrant VDE transition. By electrically combining the output of a plurality of such valve position sensors to generate a reduced number of combined rocker arm position signals, signal processing may be made easier and faster. By sampling the combined signals at unique positions along the engine cycle such that any identified valve degradation may be differentially mapped to a single valve only, the reduced number of combined cylinder valve position signals may be used to monitor a plurality of valves. In this way, an efficient VDE diagnosis can be performed with a reduced number of diagnostic components.

Note that the example process flows included herein can be used with various valve system, engine system, and/or vehicle system configurations. These process flows may represent one or more of any number of processing strategies such as event-driven, interrupt-driven, multi-tasking, multi-threading, and the like that may be performed by the control system. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or operations may be repeatedly performed depending on the particular strategy being used. Further, the described acts may graphically represent code to be programmed into a computer readable storage medium of the control system.

It will be appreciated that the configurations and process flows disclosed herein are exemplary in nature, and that these specific embodiments are not to be considered in a limiting sense, because numerous variations are possible.

The subject matter of the present disclosure includes all novel and nonobvious combinations and subcombinations of the various systems and configurations, and other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for monitoring cylinder valve deactivation in an engine operating with a plurality of cylinder valves, the system comprising,
    a first cylinder valve position sensor coupled to a first cylinder valve component; and
    a second cylinder valve position sensor coupled to a second cylinder valve component, the first and second cylinder valve position sensors coupled together to generate a combined cylinder valve signal.

2. The system of claim 1 further comprising,
    a control system configured to receive the combined cylinder valve signal, and differentiate valve degradation among the first and second cylinder valves based on the combined cylinder valve signal and an expected value of the combined signal, and further based on a crank angle at which the expected value differs from the combined signal.

3. The system of claim 2 wherein the first and second valves are located on a common cylinder.

4. The system of claim 2 wherein both the first and second valves are intake valves or exhaust valves, said valves located on differing banks of the engine.

5. The system of claim 2 wherein both the first and second valves are intake valves or exhaust valves, said valves located on a common bank of the engine.

6. The system of claim 2 wherein the first valve is an intake valve of a first cylinder and the second valve is an exhaust valve of a second cylinder, said first and second valves located on a common bank.

7. The system of claim 1 wherein the valve component is a valve rocker arm and the valve position sensor is a rocker arm position sensor.

8. The system of claim 2 wherein the control system is further configured to indicate valve degradation by setting a diagnostic code.

9. A method for monitoring cylinder valve deactivation in an engine operating with a plurality of cylinder valves, the method comprising:
    sensing a plurality of cylinder valve positions of a plurality of cylinder valves; and
    combining the plurality of sensed positions to form a combined cylinder valve signal.

10. The method of claim 9 further comprising, identifying valve degradation and differentiating valve degradation among the plurality of cylinder valves based on the combined cylinder valve signal and an expected value of the combined signal, and further based on a crank angle at which the expected value differs from the combined signal.

11. The method of claim 10 further comprising, indicating valve degradation by setting a diagnostic code.

12. The method of claim 11 further comprising, sampling the combined signal in each of a plurality of sampling windows.

13. The method of claim 12 wherein the sampling window is a crank angle sampling window.

14. The method of claim 12 wherein the plurality of sensed positions form respective binary values, and wherein the combining includes forming a binary combined valve signal value.

15. The method of claim 13 wherein combining the plurality of sensed positions to form a combined cylinder valve signal includes,
    if any of the indicated binary values is a logic low signal, forming a first binary combined valve signal value; and
    if none of the indicated logic binary values is a logic low signal, forming a second binary combined valve signal value different from the first.

16. The method of claim 9 wherein the plurality of valves include a plurality of intake valves or a plurality of exhaust valves located on a common bank.

17. The method of claim 9 wherein the plurality of valves include a plurality of intake valves and a plurality of exhaust valves located on a common bank.

18. The method of claim 13 further comprising, adjusting a valve timing of at least one of the plurality of valves, and further adjusting the sampling window responsive to the adjusted valve timing to identify valve degradation.

19. The method of claim 10 wherein the expected value of the signal is based on a VDE mode of operation.

20. A method for identifying cylinder valve degradation in a variable displacement engine operating with a plurality of cylinder valves configured to be deactivated, the method comprising, sensing a plurality of cylinder valve positions of the plurality of cylinder valves in a plurality of crank angle sampling windows, the plurality of cylinder valves including a plurality of intake valves or a plurality of exhaust valves located on a common bank of the engine;

combining the plurality of sensed positions to form a combined cylinder valve signal; and identifying valve degradation and differentiating valve degradation among the plurality of cylinder valves based on the combined cylinder valve signal and an expected value of the signal, and further based on the crank angle sampling window at which the expected value differs from the combined signal.

* * * * *